United States Patent
Michel et al.

(10) Patent No.: US 9,949,101 B2
(45) Date of Patent: Apr. 17, 2018

(54) EMERGENCY CALL SYSTEM AND METHOD

(71) Applicant: OBERTHUR TECHNOLOGIES, Colombes (FR)

(72) Inventors: Alexis Michel, Colombes (FR); Jerome Dumoulin, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/202,011

(22) Filed: Mar. 10, 2014

(65) Prior Publication Data
US 2014/0273913 A1    Sep. 18, 2014

(30) Foreign Application Priority Data

Mar. 12, 2013 (FR) ...................... 13 52167

(51) Int. Cl.
| | |
|---|---|
| *H04M 11/04* | (2006.01) |
| *H04W 4/22* | (2009.01) |
| *H04W 76/00* | (2018.01) |
| *H04M 3/00* | (2006.01) |
| *H04W 4/00* | (2018.01) |
| *H04W 4/04* | (2009.01) |
| *H04L 29/08* | (2006.01) |
| *H04W 8/18* | (2009.01) |
| *G08B 25/01* | (2006.01) |

(52) U.S. Cl.
CPC ............... *H04W 4/22* (2013.01); *H04M 3/00* (2013.01); *H04W 4/001* (2013.01); *H04W 76/007* (2013.01); *G08B 25/016* (2013.01); *H04L 67/12* (2013.01); *H04W 4/046* (2013.01); *H04W 8/183* (2013.01)

(58) Field of Classification Search
None
See application file for complete search history.

(56) References Cited

U.S. PATENT DOCUMENTS

| | | | |
|---|---|---|---|
| 7,529,351 B2 * | 5/2009 | Binning | ........................ 379/45 |
| 8,422,986 B1 * | 4/2013 | Martin | ................. H04M 11/04 |
| | | | 370/338 |

(Continued)

OTHER PUBLICATIONS

ESTI TS 103.383 technical specification, V12.0.0, Feb. 2013.*
European Search Report dated Jan. 7, 2014 from French Application No. 1352167 filed Mar. 12, 2013, pp. 1-2.

*Primary Examiner* — German J Viana Di Prisco
(74) *Attorney, Agent, or Firm* — MH2 TECHNOLOGY LAW GROUP, LLP

(57) ABSTRACT

An example of an emergency call system includes a device for triggering an emergency call and a communications device having a secure element. In various implementations, the secure element includes at least two profiles, one of which is an emergency profile; and a receiver that receives, over a local communications channel, an event issued by the device for triggering an emergency call. The communications device may also include means for activating the emergency profile, which enables emergency calls to be made in a communications network if the emergency profile is not already active. The communications device may also include means for calling an emergency number in the communications network in order to make the emergency call.

16 Claims, 2 Drawing Sheets

(56) References Cited

U.S. PATENT DOCUMENTS

| | | | |
|---|---|---|---|
| 2005/0186977 A1* | 8/2005 | Chiu | H04W 8/18 |
| | | | 455/466 |
| 2008/0132270 A1* | 6/2008 | Basir | 455/550.1 |
| 2009/0136006 A1* | 5/2009 | Milton et al. | 379/45 |
| 2009/0261958 A1* | 10/2009 | Sundararajan et al. | 340/436 |
| 2011/0268022 A1* | 11/2011 | Xu | H04Q 3/0045 |
| | | | 370/328 |
| 2011/0287733 A1 | 11/2011 | Cepuran et al. | |
| 2011/0306318 A1 | 12/2011 | Rodgers et al. | |
| 2013/0023228 A1* | 1/2013 | Watson | H04W 4/22 |
| | | | 455/404.1 |
| 2013/0165073 A1* | 6/2013 | Madsen | H04W 12/06 |
| | | | 455/411 |
| 2013/0231087 A1* | 9/2013 | O'Leary | 455/411 |
| 2013/0332026 A1* | 12/2013 | McKown | H04W 4/22 |
| | | | 701/33.7 |
| 2014/0011541 A1* | 1/2014 | Cormier | H04W 8/205 |
| | | | 455/558 |

\* cited by examiner

EMERGENCY CALL SYSTEM AND METHOD

CROSS-REFERENCE TO RELATED APPLICATIONS

This application claims priority to French Application No. 1352167 filed Mar. 12, 2013, the entire disclosure of which is hereby incorporated by reference in its entirety.

BACKGROUND OF THE INVENTION

The invention lies in the field of emergency call methods and systems, specifically methods and systems that enable an emergency number to be called, typically in order to call an emergency center, emergency doctors, the fire service, . . . .

The document "Pan-European eCall Implementation Guidelines", Draft v3.0 by the European eCall Implementation Platform (EeIP) and published on Feb. 3, 2012 sets the objective, in the context of the eCall service of the European Union, of devising a system enabling a vehicle that has suffered an accident to contact an emergency number and automatically communicate to emergency teams data suitable for giving such teams fast and effective access to the site of the accident.

The invention proposes a solution for implementing those directives.

OBJECT AND SUMMARY OF THE INVENTION

More precisely, in a first aspect, the invention provides an emergency call system comprising:
- a device for triggering an emergency call; and
- a communications device having a secure element, the secure element comprising:
  - at least two operational profiles, one of which is an emergency profile;
  - means suitable for receiving, over a local communications channel, an event issued by the device for triggering an emergency call;
  - means for activating an emergency profile, enabling emergency calls to be made in a communications network, if the profile is not already active; and
  - means for calling an emergency number in the network in order to make the emergency call.

In corresponding manner, the invention also provides an emergency call method performed by a secure element having at least two operational profiles, one of which is an emergency profile, the secure element being included in a communications device locally connected to a device for triggering an emergency call, the method comprising:
- a step of receiving, from the device, an event for triggering an emergency call via a local communications channel;
- a step of activating an emergency profile enabling emergency calls to be made in a communications network, if the profile is not already active; and
- a step of calling an emergency number in the network in order to make the emergency call.

Thus, and in general manner, the invention proposes a solution for switching automatically to an emergency operational profile referred to below as "eCall Profile" when a specific event is detected.

It should be recalled that an operational profile is a set of data and applications that enable a secure element in which the profile is installed and activated to authenticate itself with a telecommunications network.

Depending on the country, the emergency profile may:
- either need to authenticate itself with a network (in application of the 3GPP 31.102 standard). This applies in particular in Russia, which has a virtual operator with priority over the others and dedicated to emergency calls;
- or else have no need to authenticate itself on a particular network. This applies in particular to France where there is no need to be authenticated in order to call emergency numbers such as 112 for medical emergencies or 18 for the fire brigade.

However, in the present state of the art, switching over to an operational profile can take place only on receiving a command issued by an external entity of the subscription manager-secure routing (SM-SR) type. This constraint is not compatible with the requirements of an emergency service.

In a preferred embodiment, the emergency call management system of the invention is for incorporating in a vehicle.

In another embodiment, the communications device is a portable device, e.g. a telephone, coupled to sensors suitable for detecting a health state of the user of the device in order to trigger an emergency call.

Thus, and in very advantageous manner, the invention provides the possibility of activating an emergency profile automatically in order to make an emergency call when a predetermined event occurs.

The invention thus makes it possible to make an emergency call very quickly even if the operational profile that is active at the time the accident occurred is not the emergency profile.

The invention also serves to switch to the emergency profile even if the vehicle is outside the coverage of the network associated with the active operational profile, where this was not possible in the prior art since such a switchover could only be undertaken on receiving a command from the SM-SR.

In an embodiment, the device for triggering an emergency call comprises an airbag type mechanism and/or an on-board computer suitable for generating the above-mentioned event.

The invention also makes it possible for the changeover and the emergency call to be performed completely automatically without human intervention. This characteristic is particularly important in the event of bodily injury.

In a first particular embodiment, the secure element is a secure element contained in and soldered to the communications device, e.g. a micro-circuit of the eUICC type, e.g. as defined by the ETSI 102.221 standard. For further information about UICC and eUICC secure elements, the person skilled in the art should refer respectively to the ETSI 102.221 standard and to the ETSI TS 103.383 specifications.

In a particular embodiment, each of the profiles in the eUICC type security element is associated with a particular security domain.

In a particular embodiment, the emergency call is used for communicating data for locating the emergency call and preferably for calling the communications device back on a number associated with one of the profiles other than the emergency profile.

By way of example, the data is stored in the emergency profile or in a non-volatile memory of the operating system of the vehicle.

In a particular implementation, the emergency call method of the invention includes a step of identifying the emergency profile from data associated with the event.

In a preferred implementation, the step of calling the emergency number is followed by a step of activating a profile different from the emergency profile, possibly after a predetermined duration.

This characteristic is very important since it enables the emergency services to call back the vehicle that has suffered an accident.

In a particular implementation, the profile is activated on receiving a command issued by an SM-SR entity.

BRIEF DESCRIPTION OF THE DRAWINGS

Other characteristics and advantages of the invention appear more clearly and more completely on reading the following description, which is given by way of non-limiting example and with reference to the accompanying drawings, in which*.

DETAILED DESCRIPTION OF THE INVENTION

Figure 1:
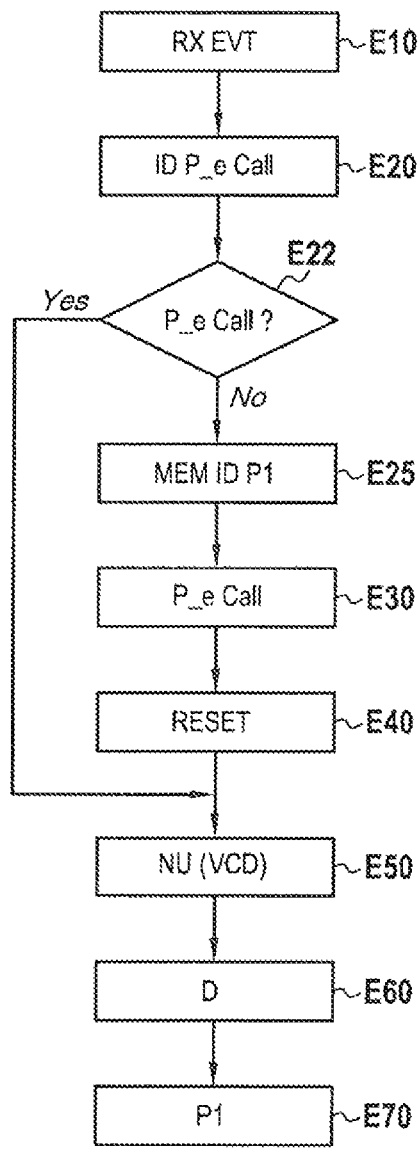
FIG. 1 is a flow chart showing the main steps of an emergency call method in accordance with the invention.

FIG. 1 is a flow chart showing the main steps of an emergency call method in accordance with the invention.

Figure 2:
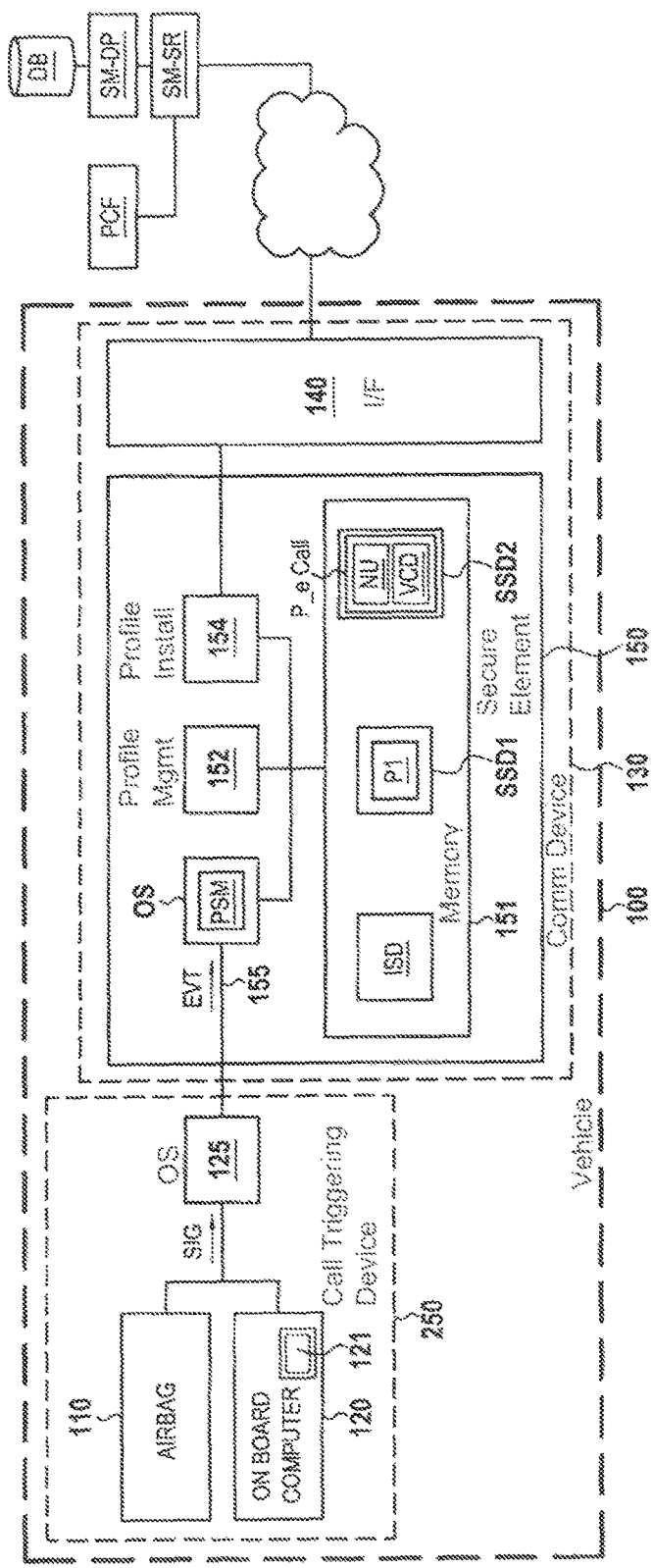
FIG. 2 is a block diagram of an emergency call system in accordance with a particular embodiment of the invention.

In the presently-described implementation, the method is performed in the vehicle 100 shown in FIG. 2.

The vehicle 100 includes a safety mechanism 110 of the airbag type and an on-board computer 120, both themselves known.

The vehicle 100 also has a communications device 130 including a secure element 150 in accordance with the invention and an interface 140 between the secure element 150 and the network.

The interface 140 comprises, in conventional manner, a transceiver coupled to an antenna.

In the presently-described embodiment, the secure element 150 is a secure element of the eUICC type. It comprises in particular:
an operating system OS;
a non-volatile memory 151;
a profile management module 152; and
a profile installation module 154.

In the presently-described embodiment, the non-volatile memory 151 has a privileged or "issuer" security domain ISD and secondary security domains SSD1, SSD2.

The issuer security domain ISD is privileged in that it is suitable in particular, and in known manner, for creating or deleting secondary security domains SSD1, SSD2 in the non-volatile memory 151, in co-operation with the profile management module 152 and the profile installation module 154.

More precisely:
the profile management module 152 communicates in secure manner with a subscription manager-secure routing (SM-SR) entity of the network in order to receive, install, and activate/deactivate a profile in the security domains SSD1, SSD2, the SM-SR entity communicating for this purpose with a policy control function (PCF) entity of the operator; and
the profile installation module 154 communicates in secure manner with a subscription manager-data preparation (SM-DP) entity of the network in order to decrypt the blocks of a profile and install them in the security domains SSD1, SSD2, the SM-DP entity communicating for this purpose with a profile database DB of the operator.

In the presently-described embodiment:
the secondary security domain SSD1 includes an operational profile P1 enabling the communications device 130 to communicate in a first mobile network MN1; and
the secondary security domain SSD2 includes an emergency profile P_eCall enabling the communications device 130 to communicate in a mobile network MN_eCall in order to make eCall emergency calls.

In the presently-described embodiment, the emergency call is used in particular for communicating data DCV enabling the emergency call to be located and preferably enabling the communications device 130 to be called on a number associated with a profile different from the emergency profile P_eCall.

To this end, in the presently-described embodiment, the emergency profile P_eCall has a data file DCV specific to the vehicle 100 and to the main driver of the vehicle and for transmission to emergency teams.

In the presently-described embodiment, the data DCV comprises:
physical characteristics of the driver (blood group, allergies);
characteristics of the vehicle (marque, model, color, . . . );
the number of passengers in the vehicle; and
the telephone number of the vehicle associated with the profile P1 that was active before the event EV.

In accordance with the invention, the communications device 130 is suitable during a step E10 for receiving an event EVT via a local communications channel 155.

The local communications channel may be a wired bus or a wireless communications channel, e.g. of the Bluetooth type.

In the presently-described embodiment, this event EVT is received by a software module PSM of the operating system OS of the secure element 150, coming from the operating system 125 of the vehicle.

In the presently-described embodiment, the event EVT is generated by the airbag type mechanism 110 and/or by the on-board computer 120. By way of example, and more precisely, the operating system 125 sends an event EVT to the software module PSM on receiving a signal SIG generated either:
on triggering of the airbag system 110; or else
when a person (e.g. a driver or a passenger of the vehicle) actuates a control 121 of the on-board computer 120.

On receiving the event EVT, the module PSM acts during a step E20 to identify the identifier of the emergency profile P_eCall. This identification may be performed with the help of data, e.g. an identifier or a flag associated with the event EVT.

During a step E22, the module PSM verifies whether the emergency profile P_eCall is active.

If it is not, the emergency profile P_eCall needs to be activated. To this end, the step E22 is followed by:
a step E25 during which the module PSM stores the identifier P1 of the active profile;
a step E30 during which the module PSM operates the profile management module 152 so as to cause it to activate the emergency profile P_eCall; and
a step E40 during which the operating system OS of the secure element 150 restarts the secure element 150, by performing a "RESET" operation, thereby automatically causing all of the data of the active profile to be read, and specifically the data of the emergency profile P_eCall.

Once the emergency profile P_eCall has been activated, the communications device 130 makes an emergency call to an emergency number NU stored in this profile during a step E50. The data DCV relating to the driver and to the vehicle and stored in the non-volatile memory 151 is preferably communicated to the emergency teams.

This emergency call may be initiated by the emergency profile P_eCall, by the operating system OS, or by a person via the interface 121 of the on-board computer 120.

In the presently-described embodiment, the communications device 130 waits for a predetermined duration D (step E60) before terminating the emergency call. Waiting for this duration D is not essential, and the emergency call may be terminated as soon as the data DCV has been transmitted to the emergency services.

Therefore, in the presently-described embodiment, the system switches back (step E70) to the profile that was active before the event EVT, i.e. to the profile P1 having the identifier that was stored in step E25. For this purpose, the module PSM operates the profile management module 152 so that it activates the profile P1, and then, the operating system OS of the secure element 150 restarts the secure element 150.

The emergency center is then in a position to call the vehicle, the telephone number of the vehicle associated with the re-activated profile being communicated to the emergency service in the data DCV in step E50.

If, during above-described step E22, it is determined that the emergency profile P_eCall is active, then the step S22 is followed by the step E50 of making the emergency call, and then followed by switching back to the profile P1 (step E70), possibly after waiting for a predetermined duration D (step E60).

In the above-described embodiment, the data file DCV specific to the vehicle 100 and to the main driver is stored in the emergency profile P_eCall.

In a variant that is not shown, this data may be stored in a non-volatile memory of the operating system 125 of the vehicle. This data is then accessible by the communications device 130 after an authentication and decoding process when it makes an emergency call (step E50).

In another variant that is not shown, the data DCV is stored in the non-volatile memory 151 outside the emergency profile P_eCall.

In the above-described embodiment, the emergency call is terminated by switching back to the profile that was active before the event EVT (step E70).

In a variant that is not shown, the emergency call may be terminated on receiving a command sent by an entity that is external to the vehicle, e.g. by the SM-SR entity, with the reception of such a command causing the profile that was active before the event EVT to be activated and causing the secure element to be restarted (RESET).

In another variant embodiment, the system remains on the emergency profile P_eCall after making the emergency call, the data DCV sent to the emergency teams then including a number associated with this profile P_eCall enabling the vehicle to be called back.

The invention claimed is:

1. An emergency call system comprising:
   a device for triggering an emergency call; and
   a communications device having a secure element, the secure element comprising:
   a memory that includes at least two profiles including an emergency profile and an operational profile;
   an embedded Universal Integrated Circuit Card (eUICC) microcircuit having security domains containing the at least two profiles; and
   a processor, operably connected to the memory, that performs operations comprising:
   receiving, over a local communications channel, an event issued by the device for triggering the emergency call;
   determining that the emergency profile is inactive;
   in response to determining that the emergency profile is inactive:
   storing an identifier of the operational profile that is currently active;
   activating, by the embedded eUICC microcircuit, the emergency profile to enable emergency calls to be made in a communications network; and
   restarting the secure element causing data of the emergency profile to be read; and
   calling an emergency number in said communications network in order to make said emergency call, wherein the emergency call is used for communicating data for locating the emergency call and for enabling the communication device to be called on a predetermined number associated with the operational profile, said data being stored in the emergency profile.

2. The emergency call system according to claim 1, wherein the operations further comprise:
   reactivating the operational profile using the identifier of the operational profile.

3. The emergency call system according to claim 2, wherein the operations further comprise:
   restarting the secure element after reactivating the operational profile.

4. The emergency call system according to claim 2, wherein said operational profile is reactivated based on receiving a command issued by a subscription manager-secure routing (SM-SR) entity.

5. The emergency call system according to claim 1, wherein the device for triggering an emergency call comprises at least one of an airbag type mechanism on a vehicle and an on-board computer on a vehicle suitable for generating said event.

6. The emergency call system according to claim 1, wherein:
   said communications device is a portable device; and
   said device for triggering an emergency call includes a set of one or more sensors suitable for detecting a health state of a user of said communications device in order to trigger an emergency call.

7. The emergency call system according to claim 1, wherein the operations further comprise, after the calling the emergency number:
   deactivating the emergency profile.

8. The emergency call system according to claim 1, wherein the operations further comprise:
   identifying said emergency profile from data associated with said event.

9. An emergency call method performed by a secure element comprising:
   a memory that includes at least two profiles including an emergency profile and an operational profile;
   an embedded Universal Integrated Circuit Card (eUICC) microcircuit having security domains containing the at least two profiles; and
   a processor, operably connected to the memory;

wherein the secure element is included in a communications device operably connected to a device for triggering an emergency call,
the emergency call method comprising:
  receiving, from the communications device, an event for triggering the emergency call via a local communications channel;
  determining that the emergency profile is inactive;
  in response to determining that the emergency profile is inactive:
    storing an identifier of the operational profile that is currently active;
    activating, by the embedded eUICC microcircuit, the emergency profile to enable emergency calls to be made in a communications network; and
    restarting the secure element causing data of the emergency profile to be read; and
  calling an emergency number in said communications network in order to make said emergency call, wherein the emergency call is used for communicating data for locating the emergency call and for enabling the communication device to be called on a predetermined number associated with the operational profile, said data being stored in the emergency profile.

10. The emergency call method according to claim 9, further comprising:
  identifying said emergency profile from data associated with said event.

11. The emergency call method according to claim 9, further comprising:
  reactivating the operational profile using the identifier of the operational profile.

12. The emergency call method according to claim 11, wherein said operational profile is reactivated based on receiving a command issued by a subscription manager-secure routing (SM-SR) entity.

13. The emergency call method according to claim 11, further comprising:
  restarting the secure element after reactivating the operational profile.

14. The emergency call method according to claim 9, wherein the device for triggering an emergency call comprises at least one of: an airbag type mechanism on a vehicle and an on-board computer on a vehicle suitable for generating said event.

15. The emergency call method according to claim 9, wherein:
  said communications device is a portable device; and
  said device for triggering an emergency call includes a set of one or more sensors suitable for detecting a health state of a user of said communications device in order to trigger an emergency call.

16. The emergency call method according to claim 9, further comprising, after the calling the emergency number:
  deactivating the emergency profile.

* * * * *